United States Patent [19]
Mujtaba

[11] Patent Number: 6,091,781
[45] Date of Patent: Jul. 18, 2000

[54] SINGLE SIDEBAND TRANSMISSION OF QPSK, QAM AND OTHER SIGNALS

[75] Inventor: Syed Aon Mujtaba, Berkeley Heights, N.J.

[73] Assignee: Lucent Technologies Inc., Murray Hill, N.J.

[21] Appl. No.: 08/970,987

[22] Filed: Nov. 14, 1997

[51] Int. Cl.[7] .................................................. H04L 27/18
[52] U.S. Cl. .......................... 375/279; 375/270; 375/321
[58] Field of Search .................................. 375/270, 279, 375/321, 280, 308, 260, 329, 276, 340; 332/103, 108

[56] References Cited

U.S. PATENT DOCUMENTS

| | | | |
|---|---|---|---|
| 4,241,451 | 12/1980 | Maixner et al. | 455/202 |
| 4,358,853 | 11/1982 | Qureshi | 375/296 |
| 4,803,700 | 2/1989 | Dewey et al. | 375/321 |
| 5,699,404 | 12/1997 | Satyamurti | 340/311.1 |
| 5,729,575 | 3/1998 | Leitch | 375/268 |
| 5,892,774 | 4/1999 | Zehavi et al. | 370/527 |
| 5,909,434 | 6/1999 | Odenwalder et al. | 370/342 |
| 5,943,361 | 8/1999 | Gilhousen et al. | 375/200 |

OTHER PUBLICATIONS

T.S. Rappaport, "Wireless Communications: Principles and Practice," Prentice–Hall, NJ, pp. 243–247, 1996.

A.V. Oppenheim and R.W. Schafer, "Discrete–Time Signal Processing," Prentice–Hall, NJ, pp. 676–688, 1989.

J.G. Proakis and M. Salehi, "Communication Systems Engineering," Prentice–Hall, NJ, pp. 310–317, 1994.

R.D. Gitlin et al., "Data Communications Principles," Plenum Press, NY, pp. 305–312 and pp. 322–325, 1992.

*Primary Examiner*—Stephen Chin
*Assistant Examiner*—Kevin M Burd
*Attorney, Agent, or Firm*—Ryan & Mason, L.L.P.

[57] ABSTRACT

Methods, apparatus and system for transmitting signals in QPSK, QAM and other similar modulation formats as single sideband (SSB) signals. An exemplary SSB-QPSK transmitter receives an in-phase data signal and a quadrature-phase data signal. The in-phase data signal and a Hilbert transform of the quadrature-phase data signal are modulated onto a cosine carrier signal, the quadrature-phase data signal and a Hilbert transform of the in-phase data signal are modulated onto a sine carrier signal, and the modulated sine and cosine carrier signals are combined to provide a modulated SSB-QPSK signal. The in-phase and quadrature-phase data signals are time-aligned signals which are interpolated prior to modulation so as to include zero values at alternating instants of time. Their corresponding Hilbert transforms therefore also exhibit alternating zero values. During modulation, the in-phase data signal can thus be interleaved with Hilbert transforms of the quadrature-phase data signal, and the quadrature-phase data signal can be interleaved with Hilbert transforms of the in-phase data signal, without any interference between the signals. Coherent quadrature detection may be used to recover both the in-phase and quadrature-phase data signals at a receiver.

19 Claims, 8 Drawing Sheets

SINGLE SIDEBAND TRANSMISSION OF QPSK, QAM AND OTHER SIGNALS

FIELD OF THE INVENTION

The present invention relates generally to communication systems and more particularly to communication systems which utilize quaternary-phase-shift-keying (QPSK), quaternary-amplitude modulation (QAM) or other similar signal transmission techniques.

BACKGROUND OF THE INVENTION

Modulation techniques based on QPSK are commonly used in cellular, personal communication service (PCS) and other types of wireless communication systems. For example, QPSK and offset QPSK (OQPSK) are used in digital wireless systems configured in accordance with the IS-95 standard as described in TIA/EIA/IS-95, "Mobile Station - Base Station Compatibility Standard for Dual-Mode Wideband Spread Spectrum Cellular System," June 1996. Other wireless system standards, including IS-54, IS-136 and GSM, also make use of QPSK or a variant thereof. FIG. 1A shows a conventional QPSK modulator 10. An in-phase (I) signal x[n] is passed through a pulse-shaping filter 12, and the output of filter 12 is modulated onto a cosine carrier signal $\cos(\omega_c t)$ in mixer 14. A quadrature-phase (Q) signal y[n] is passed through a pulse-shaping filter 16, and the output of filter 16 is modulated onto a sine carrier signal $\sin(\omega_c t)$ in mixer 18. The I and Q radio frequency (RF) signals from mixers 14 and 18 are supplied as inputs to a signal combiner 20. The signal combiner 20 combines the I and Q RF signals to form an output QPSK signal z(t) which may be transmitted over a communication channel to a receiver. QPSK modulation thus involves transmitting independent signals on the I and Q components of the signal z(t).

Single sideband (SSB) modulation is a modulation technique that has historically received considerably more attention for analog rather than digital transmission applications, and is described in greater detail in, for example, W. E. Sabin and E. O. Schoenike (Eds.) "Single Sideband Systems & Circuits," 2nd Edition, McGraw-Hill, New York, 1995. FIG. 1B shows a conventional discrete-time SSB modulator 30. An in-phase signal x[n] is passed through a delay element 32 and a pulse-shaping filter 34, and the output of filter 34 is modulated onto $\cos(\omega_c t)$ in mixer 36. Unlike QPSK modulation, which as described above transmits independent signals x[n] and y[n] in its respective I and Q components, SSB modulation transmits x[n] in the I component and the Hilbert transform of x[n] in the Q component. The Q component in SSB modulator 30 is therefore generated by passing x[n] through a Hilbert filter 38 and a pulse-shaping filter 40, and modulating the output of filter 40 onto $\sin(\omega_c t)$ in mixer 42. A signal combiner 44 combines the I and Q RF signals from mixers 36 and 42 to generate an SSB signal w(t) for transmission. While SSB modulation transmits half the number of bits as QPSK modulation, it also utilizes half the bandwidth, such that SSB and QPSK modulation have the same spectral efficiency.

A conventional QPSK signal generally cannot be transmitted as an SSB signal. For example, the QPSK signal z(t) generated by QPSK modulator 10 may be expressed as:

$$z(t) = \{x[n]*g(t)\}\cos(w_c t) + \{y[n]*g(t)\}\sin(w_c t). \tag{1}$$

Given that $x[n], y[n] \in \{\pm 1\}$ for QPSK signaling, the transmitted signal z(t) can be written as:

$$z(t) = \text{Re}\left\{\sum_n (x_n + jy_n)g(t - nT)e^{j\omega_c t}\right\}. \tag{2}$$

The complex baseband-equivalent representation of the transmitted QPSK signal z(t) may be defined as:

$$z_n = x_n + jy_n. \tag{3}$$

Similarly, the complex baseband-equivalent representation of the SSB signal w(t) can be written as:

$$w_n = x_n + j\hat{x}_n. \tag{4}$$

where $\hat{x}(t) = H\{x(t)\}$ and H is the Hilbert transform operator. If the conventional QPSK signal as defined in (3) is transformed into an SSB signal, the resulting signal is given by:

$$(x - \hat{y}) + j(\hat{x} + y). \tag{5}$$

It can be seen from (5) that a conventional SSB transformation of a QPSK signal results in a catastrophic interference between the I and Q components that cannot be removed at the receiver. As a result, SSB transmission is generally not utilized in QPSK communication systems. Similar problems have prevented the use of SSB transmission with other types of similar modulation techniques, including quadrature-amplitude modulation (QAM).

SUMMARY OF THE INVENTION

The present invention provides techniques which allow signals modulated using QPSK, QAM or other similar modulation formats to be transmitted as SSB signals. As a result, the invention provides the benefits of SSB transmission in communication systems utilizing QPSK, QAM and other modulation formats. In an illustrative embodiment of the invention, an in-phase data signal x[n] and a Hilbert transform $H_y$ of a quadrature-phase data signal y[n] are modulated onto a cosine carrier signal, and the quadrature-phase data signal y[n] and a Hilbert transform $H_x$ of the in-phase data signal x[n] are modulated onto a sine carrier signal. The x[n] and y[n] signals are time-aligned signals which are interpolated prior to modulation so as to include zero values at alternating instants of time. Their corresponding Hilbert transforms $H_x$ and $H_y$ therefore also exhibit alternating zero values. This arrangement of alternating zeros allows x[n] to be interleaved with $H_y$ and y[n] to be interleaved with $H_x$, without creating any interference between x[n] and y[n] in the modulation process. The modulated cosine and sine carrier signals are then combined to generate a modulated SSB-QPSK signal for transmission. The SSB-QPSK signal can be demodulated in a receiver which uses coherent quadrature detection to recover both the x[n] and y[n] data signals.

The modulation techniques of the invention provide substantially the same spectral efficiency as conventional SSB and QPSK modulation, but can provide advantages over both SSB and QPSK in particular applications. For example, in the presence of equalization imperfections on Rayleigh-faded mobile radio channels, the SSB-QPSK modulation of the invention can provide better bit error rate (BER) performance than conventional SSB or QPSK modulation.

DETAILED DESCRIPTION OF THE INVENTION

The invention will be illustrated below in conjunction with an exemplary communication system utilizing single sideband (SSB) quaternary-phase-shift-keying (QPSK) modulation. It should be understood, however, that the invention is not limited to use with any particular type of communication system or modulation format, but is instead more generally applicable to any system in which it is desirable to transmit signals modulated using QPSK, quaternary-amplitude modulation (QAM) or other similar modulation techniques in an SSB format. For example, the invention may be used in a variety of wireless communication systems, including systems configured in accordance with the IS-54, IS-95, IS-136 and GSM standards. Additional details regarding these and other communication systems in which the invention may be utilized can be found in, for example, T. S. Rappaport, "Wireless Communications: Principles and Practice," Prentice-Hall, N.J., 1996, which is incorporated by reference herein.

The invention provides techniques which enable signals modulated in QPSK, QAM and other similar modulation formats to be transmitted as SSB signals. As a result, the invention provides the benefits of SSB transmission in communication systems utilizing QPSK, QAM and other similar modulation formats. In order to illustrate the operation of the invention, the discrete Hilbert transform will first be described in greater detail. An ideal Hilbert transformer may be considered an all-pass filter that rotates an input signal by 90 degrees. The frequency response of the ideal Hilbert transformer is therefore given by:

$$H(\omega) = \begin{cases} -j & 0 < \omega \leq \pi \\ 0 & \omega = 0 \\ j & -\pi < \omega < 0 \end{cases} \quad (6)$$

The resulting impulse response of the ideal Hilbert transformer is then given by:

$$h[n] = \begin{cases} \dfrac{2\sin^2(\pi n/2)}{\pi n} & n \neq 0 \\ 0 & n = 0 \end{cases} \quad (7)$$

As can be seen from (7), the impulse response of the Hilbert transformer is non-causal and infinite in duration. In practical applications, the Hilbert transformer includes a finite number N of filter taps, where N is selected based on the degree of SSB suppression that needs to be achieved in a given application. Certain windowing techniques can also be used to further reduce the number of taps. These and other details regarding Hilbert transformers are described in, for example, A. V. Oppenheim and R. W. Schafer, "Discrete-Time Signal Processing," Prentice-Hall, N.J., 1989, which is incorporated by reference herein.

The ideal Hilbert transformer characterized above may be made causal by introducing a delay of $n_d = (N-1)/2$, assuming that N is odd. The resulting impulse response is given by:

$$h[n] = \begin{cases} \dfrac{2\sin^2[\pi(n-n_d)/2]}{\pi(n-n_d)} & n \neq n_d \\ 0 & n = n_d \end{cases} \quad (8)$$

Figure 2A:
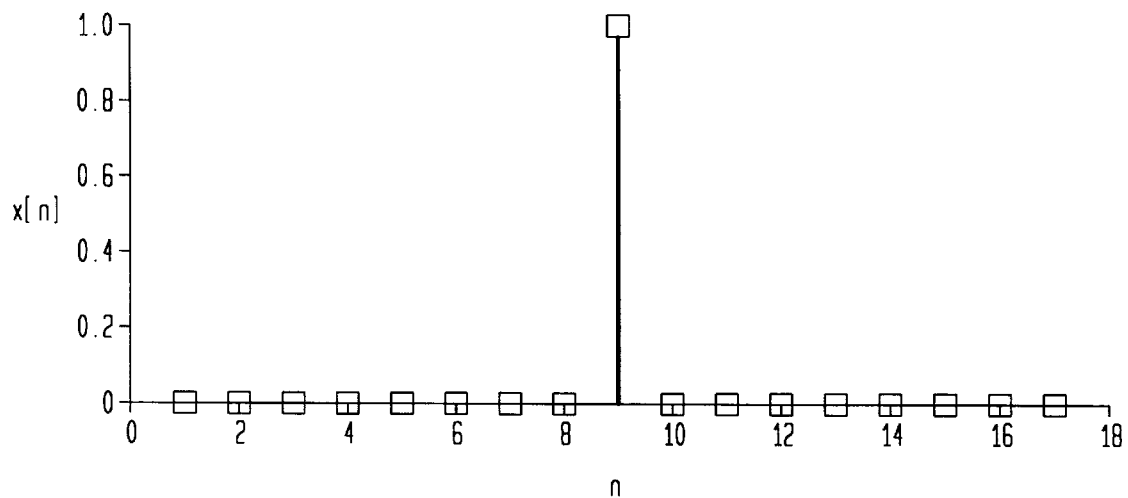
FIGS. 2A and 2B show an impulse function and its Hilbert transform, respectively.
Figure 2B:
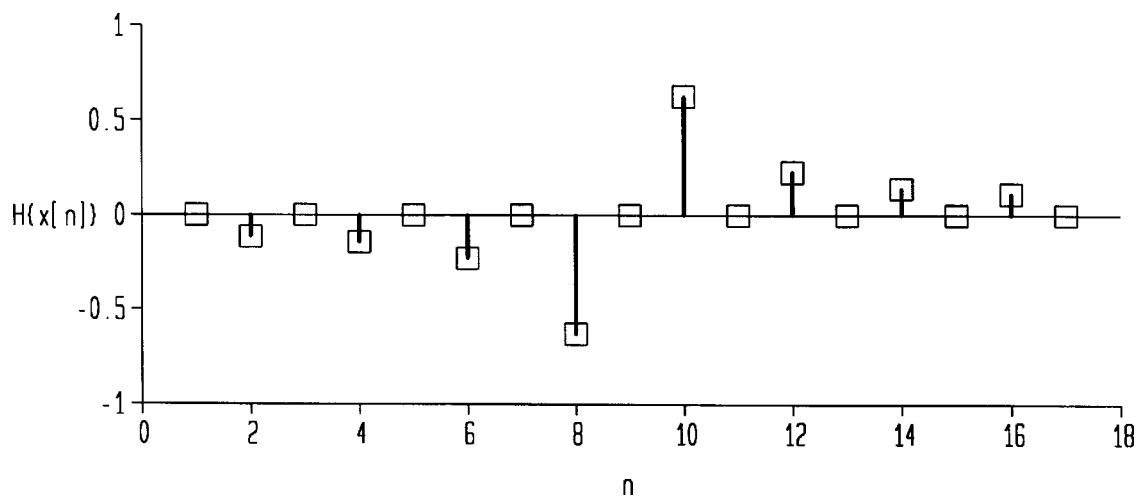

Due to the $\pi/2$ term appearing in the argument of the sin function in (8), the impulse response h[n] goes to zero every other time instant, i.e., h[n] is zero for $n=n_d$, $n=n_d \pm 2$, $n=n_d \pm 4$ and so on. By way of example, FIG. 2A shows an impulse function x[n] and FIG. 2B shows the corresponding impulse response h[n]=H {x[n]} of the Hilbert transformer for $n_d=9$. It can be seen from FIG. 2B that the impulse response h[n] goes to zero for values of n=1, 3, 5, 7, 9, 11 and so on.

Figure 3A:
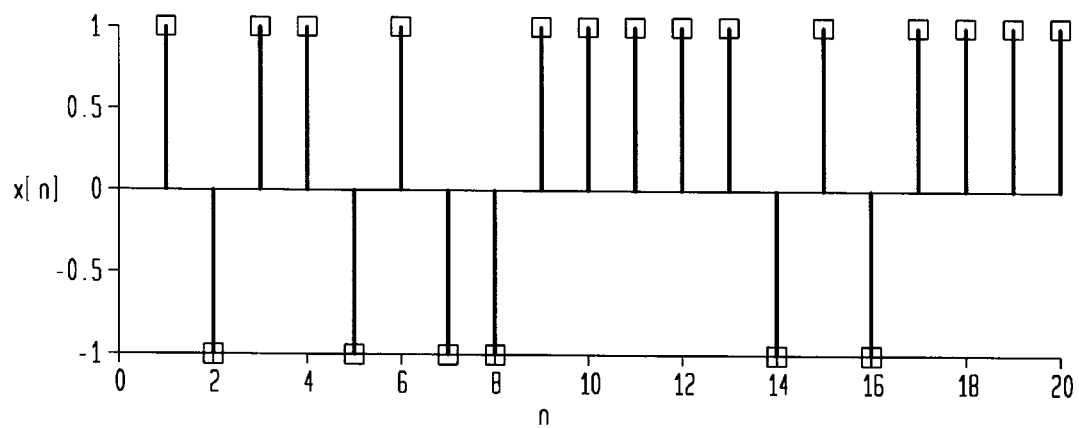
FIGS. 3A and 3B show an impulse train and its Hilbert transform, respectively.
Figure 3B:
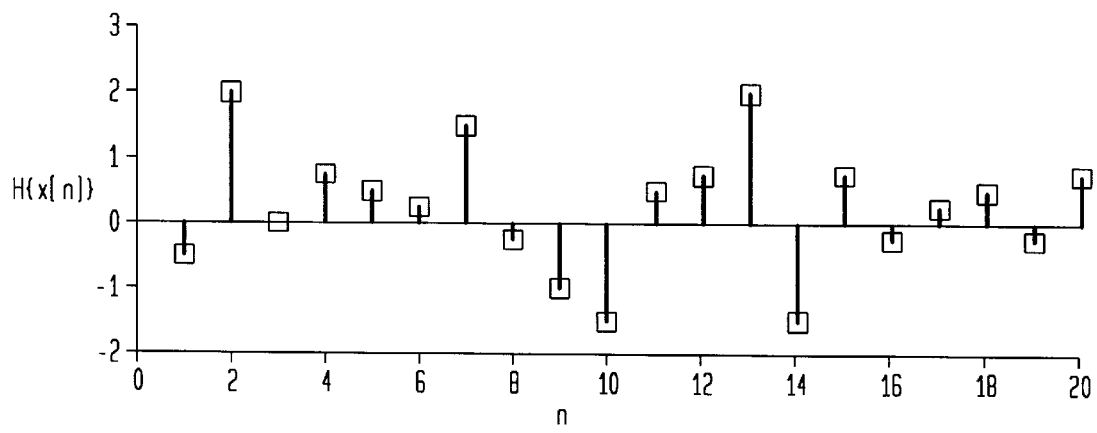

If the input to a causal Hilbert transformer is a train of impulse functions, such as that shown in FIG. 3A, then the alternating zeros do not appear in the corresponding Hilbert transform H{x[n]}, as shown in FIG. 3B. The train of impulse functions in FIG. 3A may be expressed as $\Sigma_k \delta(n-k)$. The corresponding Hilbert transform in FIG. 3B is given by:

$$\sum_k \dfrac{2\sin^2[\pi(n-n_d-k)/2]}{\pi(n-n_d-k)} \quad (9)$$

Figure 1A:
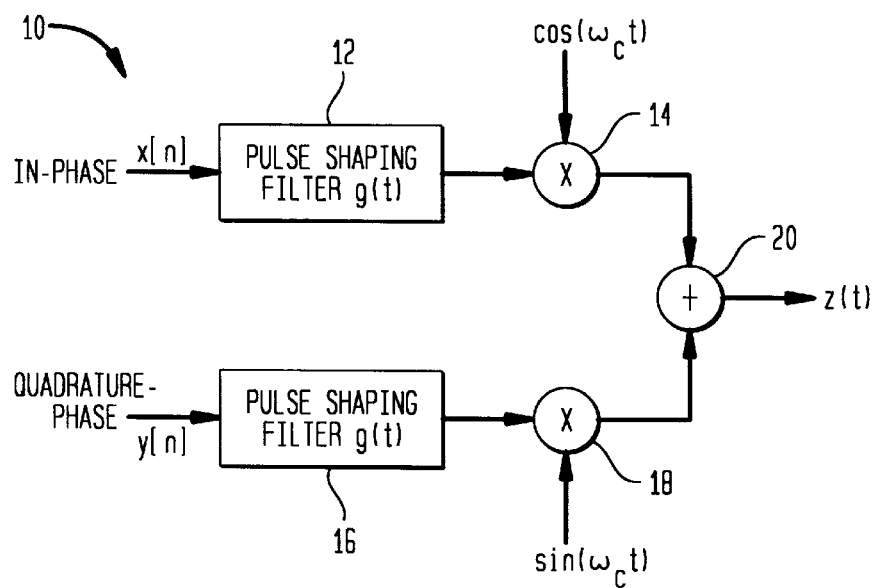
FIG. 1A shows a conventional QPSK modulator.
Figure 1B:
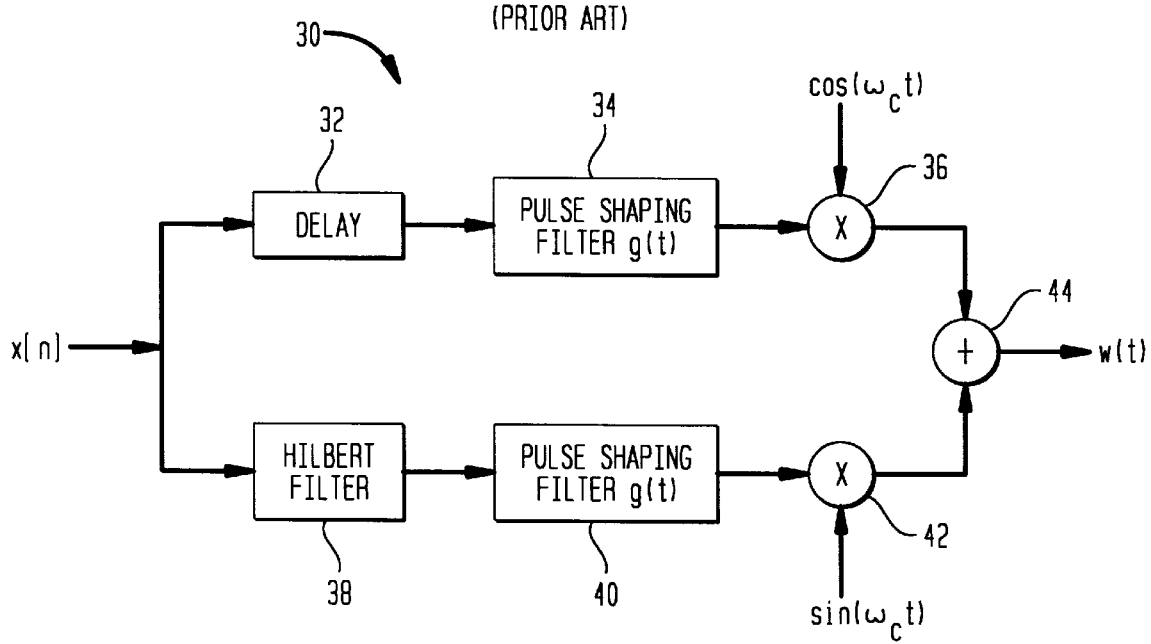
FIG. 1B shows a conventional discrete-time SSB modulator.

It can be seen from (9) that, since the index k increments by 1 during the summation process, only half of the terms contributing to the final sum will be zero. Therefore, for any value of n, the sum would not be zero, and the alternating zeros illustrated in conjunction with FIG. 2B would therefore not appear in the Hilbert transform. This provides an illustration of why a QPSK signal cannot be transformed into an SSB signal using conventional techniques. More particularly, if the signal x[n] modulates the cosine carrier and its Hilbert transform modulates the sine carrier, as in the conventional SSB modulator 30 of FIG. 1B, modulating the QPSK quadrature-phase signal y[n] on the sine carrier would lead to catastrophic interference with the Hilbert transform, as was previously described.

Figure 4A:
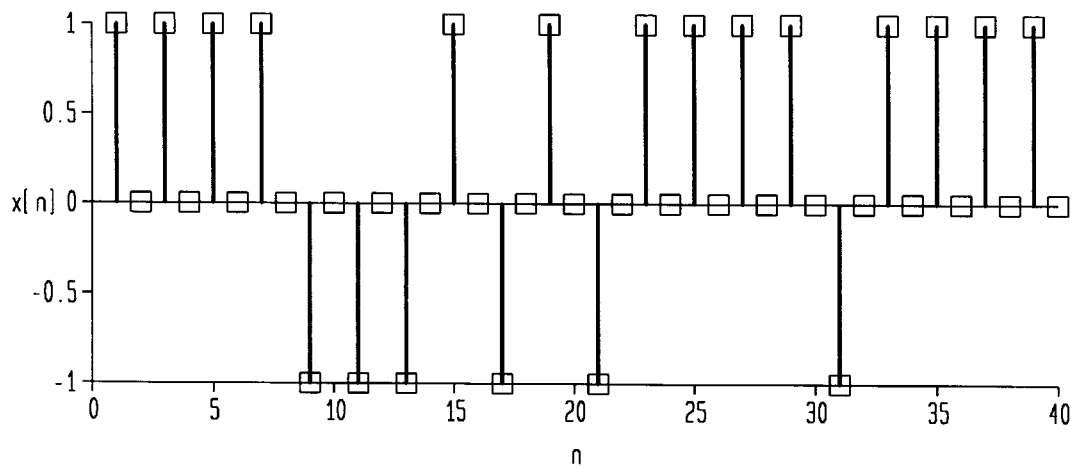
FIGS. 4A and 4B show a zero-interpolated impulse train and its Hilbert transform, respectively.

The invention allows a QPSK signal to be transmitted as an SSB signal by recovering the alternating zeros in the Hilbert transform of in-phase signal x[n], and interleaving the quadrature-phase signal y[n] into Hilbert transform at the locations of the alternating zeros. In other words, in accordance with the invention, the quadrature-phase signal y[n] can be inserted in locations where the Hilbert transform of x[n] is zero. For example, if x[n] is an impulse train containing alternating zeros as shown in FIG. 4A, x[n] can be expressed as $\Sigma_k \delta(n-2k)$, and the corresponding Hilbert transform illustrated in FIG. 4B is then given by:

$$\sum_k \dfrac{2\sin^2[\pi(n-n_d-2k)/2]}{\pi(n-n_d-2k)} \quad (10)$$

Figure 4B:
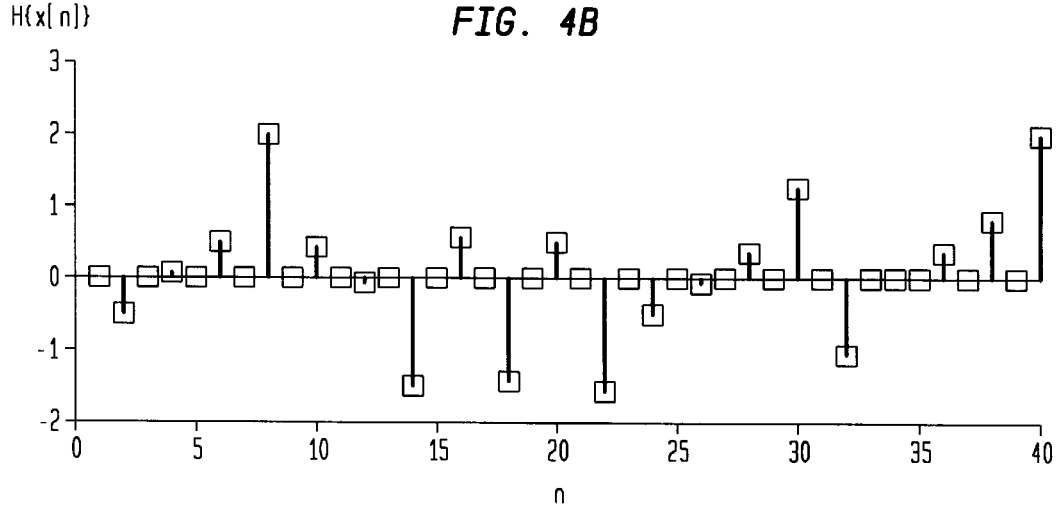

In the summation (10), if $n-n_d$ is even, then the argument of the sin function will remain even over the entire summation process and a zero sum would be obtained, as can be seen from FIG. 4B. If the signal x[n] appears as a delta function at nd, i.e., x[n]=(n−n$_d$), then the value of the Hilbert transform at n=n$_d$ would be zero. Similarly, when x[n]=δ(n−n$_d$−2), the value of the Hilbert transform at n=n$_d$+2 would be zero. Thus, wherever x[n] is non-zero, its Hilbert transform at that corresponding instant is zero and vice-versa. If y[n] can be generated such that it is zero at alternating instants in time, then its Hilbert transform would also exhibit alternating zeros.

An illustrative embodiment of the invention thus generates two signals x[n] and y[n] which have a value of zero at alternating instants of time, such that their Hilbert transforms also exhibit alternating zeros. If the non-zero values of x[n] and y[n] are time aligned, then the non-zero values of their respective Hilbert transforms are also time aligned. As described in conjunction with FIG. 1A, conventional QPSK modulation generally transmits x[n] on the cosine carrier and y[n] on the sine carrier. A QPSK signal can be transmitted as an SSB signal in accordance with the illustrative embodiment of the invention by transmitting the Hilbert transform of x[n], designated H$_x$, on the sine carrier, and the Hilbert transform of y[n], designated H$_y$, on the cosine carrier. Thus, if x[n] and y[n] are time aligned, H$_y$ will interleave with x[n] without any interference and similarly H$_x$ will interleave with y[n] without any interference. These and other techniques of transmitting a QPSK signal in an SSB format in accordance with the invention will be generally referred to herein as SSB-QPSK modulation.

Figure 5A:
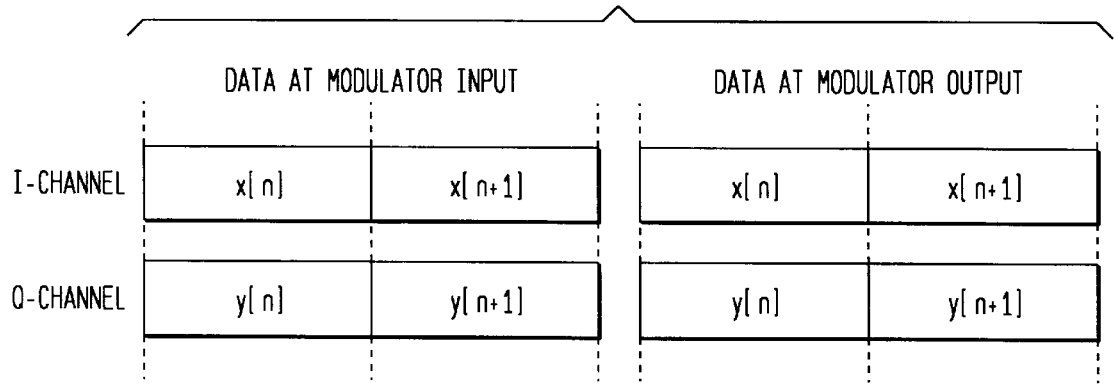
FIGS. 5A, 5B and 5C compare modulation formats for conventional QPSK, conventional SSB, and SSB-QPSK in accordance with an illustrative embodiment of the invention.
Figure 5B:
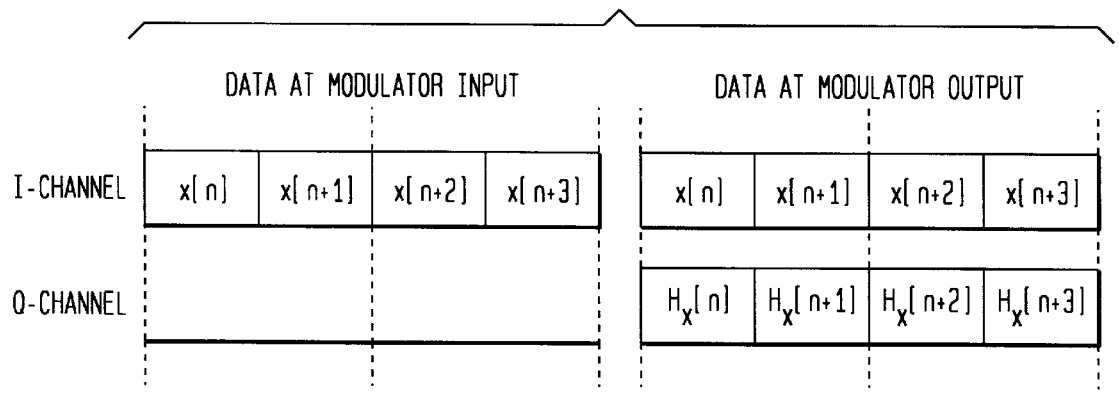
Figure 5C:
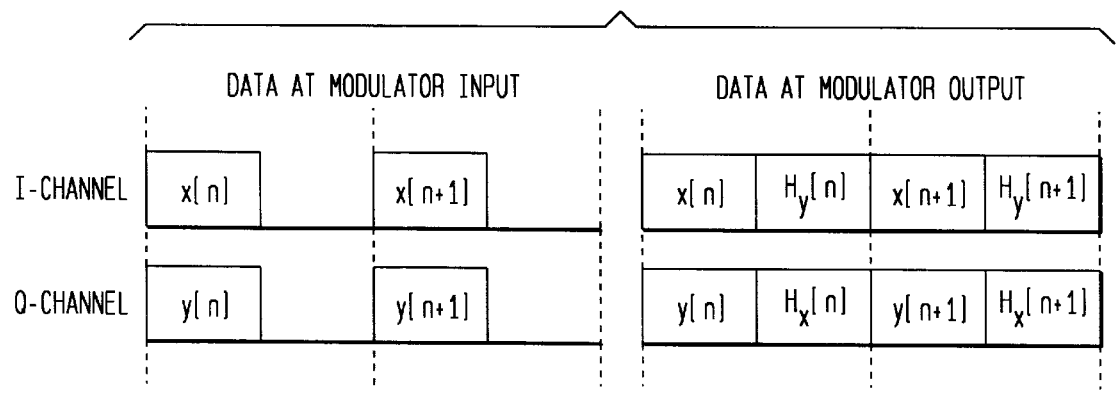

FIGS. 5A, 5B and 5C compare transmission formats for conventional QPSK modulation (FIG. 5A) and conventional SSB modulation (FIG. 5B) with SSB-QPSK modulation in accordance with the invention (FIG. 5C). It is assumed that the transmission bandwidth is the same for each of the three transmission formats. In the case of conventional QPSK transmission, signal data introduced in the I-channel (i.e., x[n], x[n+1], . . . ) and signal data introduced in the Q-channel (i.e., y[n], y[n+1], . . . ) are modulated by a QPSK modulator onto respective cosine and sine carriers after pulse shaping, as illustrated in FIG. 5A. In the case of conventional SSB transmission, signal data is introduced only in the I-channel (i.e., x[n], x[n+1], . . .), and the SSB modulator extracts the signal data for the Q-channel by generating Hilbert transforms (i.e., H$_x$[n], H$_x$[n+1], . . . ) of the I-channel data, as illustrated in FIG. 5B.

In the case of SSB-QPSK modulation, signal data is introduced in both the I-channel and the Q-channel as shown in FIG. 5C. An SSB-QPSK modulator, to be described in greater detail below, interpolates between the introduced data with zeros, and then extracts the Hilbert transforms, such that the introduced data and the corresponding Hilbert transforms are arranged as shown for transmission. The I-channel in the SSB-QPSK transmission format includes the data introduced in the I-channel (i.e., x[n], x[n+1], . . . ) interleaved with the Hilbert transforms (i.e., H$_y$[n], H$_y$[n+1], . . . ) of the data introduced in the Q-channel (i.e., y[n], y[n+1], . . .). Similarly, the Q-channel in the SSB-QPSK transmission format includes the data introduced in the Q-channel interleaved with the Hilbert transforms (i.e., H$_x$[n], H$_x$[n+1], . . . ) of the I-channel data.

Figure 6:
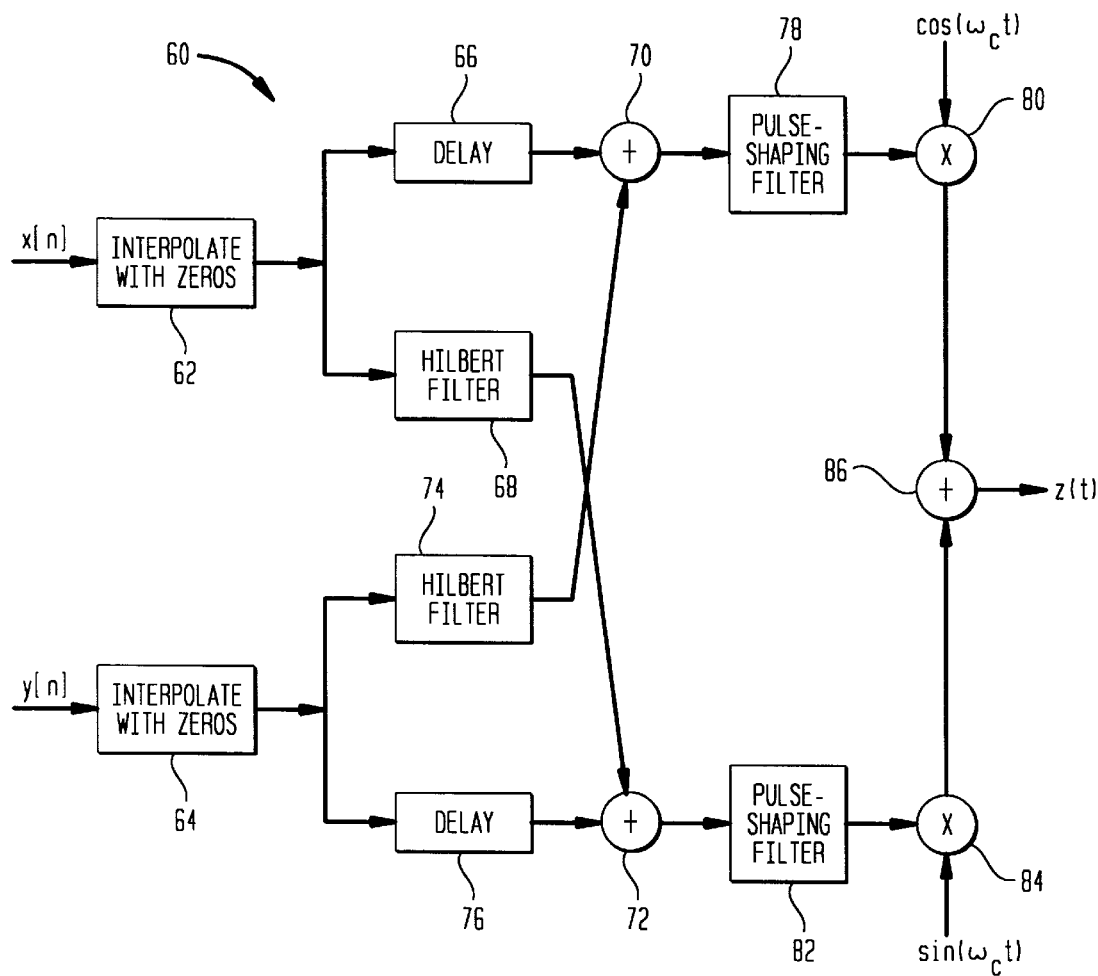
FIG. 6 shows an exemplary SSB-QPSK transmitter in accordance with the invention.

FIG. 6 shows an exemplary SSB-QPSK transmitter 60 which implements the above-described illustrative embodiment of the invention. The transmitter 60 includes interpolation devices 62 and 64 for interpolating with zeros between the introduced data of the input signals x[n] and y[n], respectively. The interpolated signal x[n] is separated into two parts. One part is delayed in a delay element 66, and the other part is Hilbert transformed in a Hilbert filter 68.

The delayed version of x[n] from delay element 66 is applied to a signal combiner 70, and the Hilbert transform of x[n] is applied to another signal combiner 72. The delay of delay element 66 is selected to match the delay introduced by the Hilbert filter 68.

The interpolated signal y[n] is similarly processed using a Hilbert filter 74 and a delay element 76, with the Hilbert transform of y[n] applied to signal combiner 70, and the delayed version of y[n] applied to a signal combiner 70. The delay in delay element 76 is selected to match the delay introduced by the Hilbert filter 74. The signal combiner 70 thus sums the Hilbert transform of y[n] with the delayed version of x[n], and the signal combiner 72 sums the transform of x[n] with the delayed version of y[n], to produce I-channel and Q-channel data signals similar to those shown in FIG. 5C. The summation operations performed by signal combiners 70 and 72 in FIG. 6 may thus be viewed as time-interleaving operations. The I-channel data signal is then pulse shaped in a filter 78 and the pulse-shaped signal is modulated on a cosine carrier signal $\cos(\omega_c t)$ in a mixer 80. Similarly, the Q-channel data signal is pulse shaped in a filter 82 and modulated on a sine carrier signal $\sin(\omega_c t)$ in a mixer 84. The I-channel and Q-channel RF signals from mixers 80 and 84 are combined in a signal combiner 86 to generate an SSB-QPSK signal z(t) in accordance with the invention.

Figure 7:
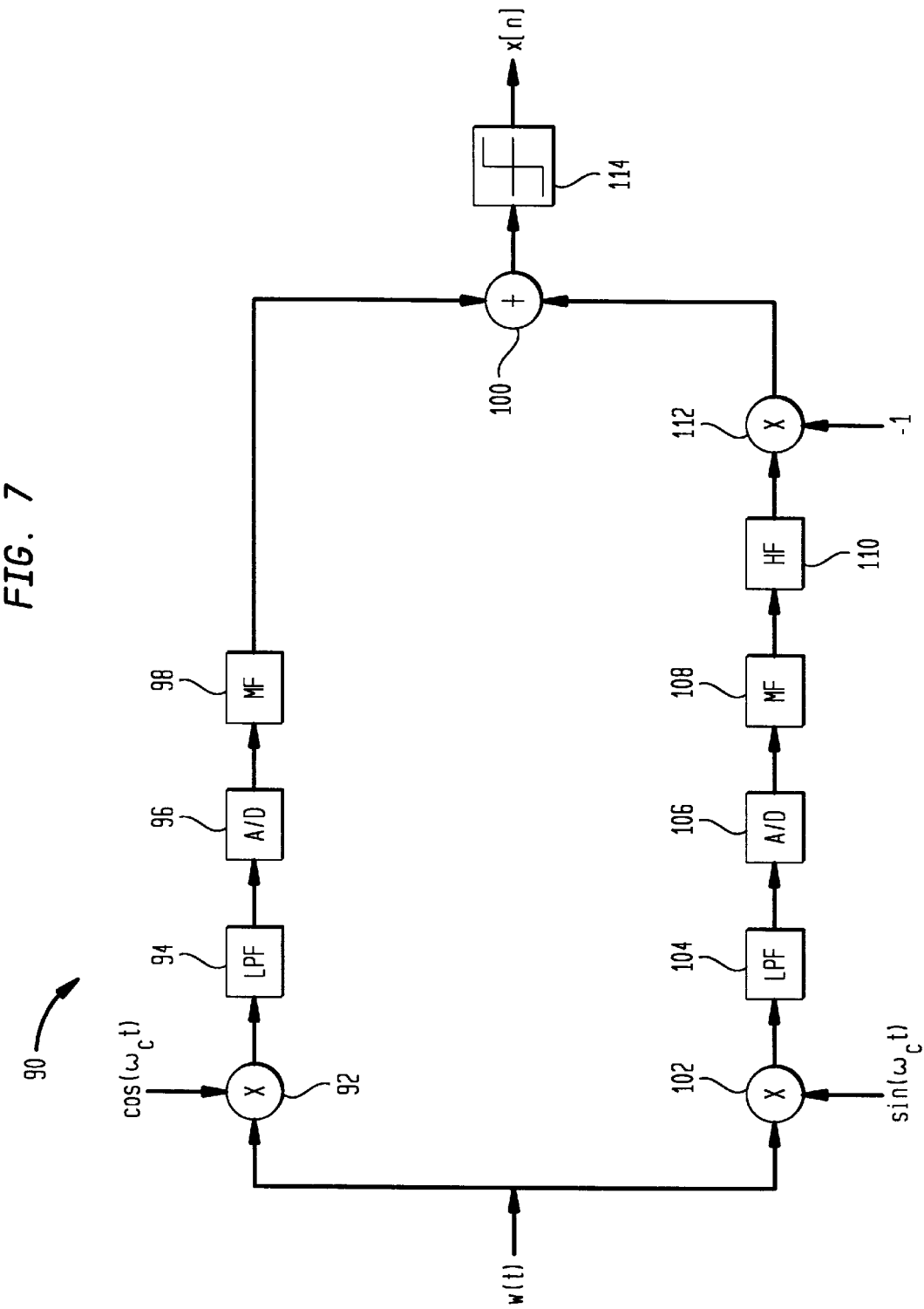
FIG. 7 shows a dual-branch SSB receiver in accordance with the invention.

The operation of an SSB-QPSK receiver in accordance with the invention will be described below in conjunction with FIGS. 7 and 8. A conventional single-branch SSB receiver implementing a coherent analog demodulation process mixes a received SSB signal with a locally-generated cosine carrier, and then low pass filters the result to recover x(t). Information arriving on the sine term of the SSB signal is usually ignored. FIG. 7 shows a dual-branch SSB receiver 90 in which a received SSB signal w(t) is quadrature demodulated in accordance with the invention to recover information from both the cosine and sine terms of the SSB signal. The I-channel information arriving on the cosine term of the SSB signal w(t) is coherently demodulated by mixing w(t) with $\cos(\omega_c t)$ in mixer 92, and low pass filtering the result in low pass filter (LPF) 94. The output of the LPF 94 is converted to a digital signal in analog-to-digital (A/D) converter 96, and the digital signal is passed through a matched filter (MF) 98 and then applied to an input of a signal combiner 100. The Q-channel information arriving on the sine term of the SSB signal w(t) is coherently demodulated by mixing w(t) with $\sin(\omega_c t)$ in mixer 102, and low pass filtering the result in LPF 104. The output of the LPF 104 is converted to a digital signal in AID converter 106, and the digital signal is passed through an MF 108. The output of the MF 108 is then Hilbert transformed in a Hilbert filter (HF) 110.

From equation (4) above it can be seen that the Q-channel information on the sine term of the SSB signal corresponds generally to $\hat{x}=H\{x\}$. In order to obtain x from H $\{x\}$, the receiver 90 makes use of the property of the Hilbert transform that $H\{H\{x\}\}=-x$. Therefore, the output of HF 110, which corresponds to $H\{H\{x\}\}$ or −x, is inverted by multiplying it with −1 in multiplier 112, so as to obtain x. The output of multiplier 112 is summed with the output of MF 98 in signal combiner 100, and the result is thresholded in a threshold device 114 to recover x[n]. Since the signals applied to signal combiner 100 add coherently while the noise adds incoherently, the signal-to-noise ratio is effectively doubled after the summation in signal combiner 100. The receiver 90 thus delivers substantially the same bit error rate (BER) performance as a conventional QPSK receiver. In contrast, the BER performance of the above-noted conventional single-branch SSB receiver is approximately 3 dB worse than that of either the dual-branch SSB receiver 90 or the conventional QPSK receiver.

Figure 8:
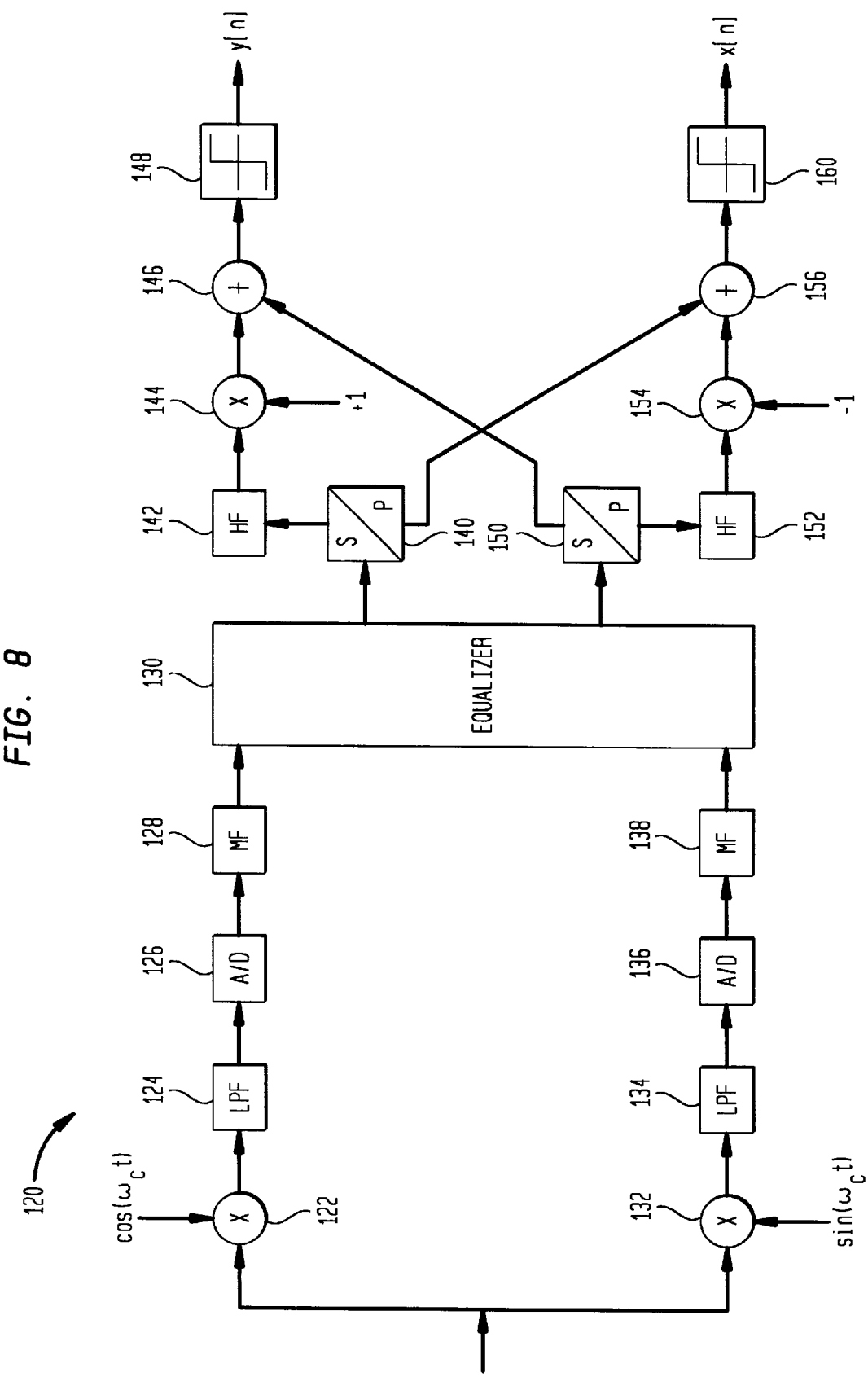
FIG. 8 shows an SSB-QPSK receiver in accordance with the invention.

FIG. 8 shows an SSB-QPSK receiver 120 in accordance with an illustrative embodiment of the invention. The SSB-QPSK receiver 120 demodulates the above-described SSB-QPSK signal using the dual-branch quadrature demodulation techniques illustrated in FIG. 7. An incoming SSB-QPSK signal is quadrature demodulated, with mixer 122, LPF 124, A/D converter 126 and MF 128 used to recover the I-channel information on the cosine carrier, and mixer 132, LPF 134, A/D converter 136 and MF 138 used to recover the Q-channel information on the sine carrier. The outputs of the MFs 128 and 138 are applied to an equalizer 130 which removes intersymbol interference (ISI) which may have been introduced in the transmission channel. The resulting output signals are converted from serial to parallel form in serial-to-parallel (S/P) converters 140 and 150. The cosine-demodulated I-channel signal at the output of S/P converter 140 corresponds to a real signal, while the sine-demodulated Q-channel signal at the output of S/P converter 150 corresponds to an imaginary signal. The real signal from S/P converter 140 is split into an x[n] data part and an $H_y$ Hilbert transform part. Similarly, the imaginary signal from S/P converter 150 is split into ay[n] data part and an $H_x$ Hilbert transform part. This composition of the I-channel and Q-channel signals was described above in conjunction with FIG. 5C. The $H_y$ Hilbert transform part from S/P converter 140 is processed through Hilbert filter 142 and multiplier 144 in the manner described in conjunction with FIG. 7, and then combined in signal combiner 146 with the y[n] data part from S/P converter 150. The resulting combined signal is thresholded in threshold device 148 to yield the output signal y[n]. Similarly, the $H_x$ Hilbert transform part from S/P converter 150 is processed through Hilbert filter 152 and multiplier 154, combined in signal combiner 156 with the x[n] data part from S/P converter 140, and the resulting combined signal is thresholded in threshold device 160 to yield the output signal x[n].

The SSB-QPSK modulation techniques of the invention provide substantially the same spectral efficiency as conventional SSB and QPSK modulation, but can provide advantages over both SSB and QPSK in particular applications. For example, in the presence of equalization imperfections on Rayleigh-faded mobile radio channels, the SSB-QPSK modulation of the invention can provide better BER performance than conventional SSB or QPSK modulation.

The above-described embodiments of the invention are intended to be illustrative only. Numerous alternative embodiments within the scope of the following claims will be apparent to those skilled in the art.

What is claimed is:

1. A method of generating a modulated single sideband signal for transmission in a communication system, the method comprising the steps of:
   modulating an in-phase data signal and a Hilbert transform of a quadrature-phase data signal onto a first carrier signal; and
   modulating the quadrature-phase data signal and a Hilbert transform of the in-phase data signal onto a second carrier signal, such that the modulated first and second carrier signals when combined provide the modulated single sideband signal.

2. The method of claim 1 wherein the modulated single sideband signal is a single sideband quaternary-phase-shift-keying (QPSK) signal.

3. The method of claim 1 wherein the step of modulating an in-phase data signal and a transform of a quadrature-phase data signal onto a first carrier signal further includes modulating an interpolated in-phase data signal and a Hilbert transform of an interpolated quadrature-phase data signal onto a cosine carrier signal.

4. The method of claim 1 wherein the step of modulating the quadrature-phase data signal and a transform of the in-phase data signal onto a second carrier signal further includes modulating an interpolated quadrature-phase data signal and a Hilbert transform of an interpolated in-phase data signal onto a sine carrier signal.

5. The method of claim 1 wherein the in-phase and the quadrature-phase data signals are time-aligned signals.

6. The method of claim 1 wherein the step of modulating an in-phase data signal and a transform of a quadrature-phase data signal onto a first carrier signal further includes time interleaving portions of the in-phase data signal with Hilbert transforms of portions of the quadrature-phase data signal.

7. The method of claim 1 wherein the step of modulating the quadrature-phase data signal and a transform of the in-phase data signal onto a second carrier signal further includes time interleaving portions of the quadrature-phase data signal with Hilbert transforms of portions of the in-phase data signal.

8. The method of claim 1 wherein the in-phase and the quadrature-phase signals are interpolated so as to include zero values at alternating instants of time, such that their corresponding Hilbert transforms also exhibit alternating zero values.

9. An apparatus for of generating a modulated single sideband signal for transmission in a communication system, the apparatus comprising:
   an in-phase channel operative to modulate an in-phase data signal and a Hilbert transform of a quadrature-phase data signal onto a first carrier signal; and
   a quadrature-phase channel operative to modulate the quadrature-phase data signal and a Hilbert transform of the in-phase data signal onto a second carrier signal, such that the modulated first and second carrier signals when combined provide the modulated single sideband signal.

10. The apparatus of claim 9 wherein the modulated single sideband signal is a single sideband quaternary-phase-shift-keying (QPSK) signal.

11. The apparatus of claim 9 wherein the in-phase channel is further operative to modulate an interpolated in-phase data signal and a Hilbert transform of an interpolated quadrature-phase data signal onto a cosine carrier signal.

12. The apparatus of claim 9 wherein the quadrature-phase channel is further operative to modulate an interpolated quadrature-phase data signal and a Hilbert transform of an interpolated in-phase data signal onto a sine carrier signal.

13. The apparatus of claim 9 wherein the in-phase and the quadrature-phase data signals are time-aligned signals.

14. The apparatus of claim 9 wherein the in-phase channel is further operative to time-interleave portions of the in-phase data signal with Hilbert transforms of portions of the quadrature-phase data signal.

15. The apparatus of claim 9 wherein the quadrature-phase channel is further operative to time-interleave portions of the quadrature-phase data signal with Hilbert transforms of portions of the in-phase data signal.

16. The apparatus of claim 9 wherein the in-phase and quadrature-phase channels are further operative to interpolate the respective in-phase and the quadrature-phase signals such that the in-phase and quadrature-phase signals include zero values at alternating instants of time, and their corresponding Hilbert transforms also exhibit alternating zero values.

17. A method of demodulating a received single sideband signal in a communication system, the method comprising the steps of:

demodulating a first carrier signal to recover an in-phase data signal and a Hilbert transform of a quadrature-phase data signal; and demodulating a second carrier signal to recover the quadrature-phase data signal and a Hilbert transform of the in-phase data signal, wherein the Hilbert transform of the in-phase data signal is used to improve detection of the in-phase data signal, and the Hilbert transform of the quadrature-phase data signal is used to improve detection of the quadrature-phase data signal.

18. An apparatus for demodulating a received single sideband signal in a communication system, the apparatus comprising:

an in-phase channel for demodulating a first carrier signal to recover an in-phase data signal and a Hilbert transform of a quadrature-phase data signal; and a quadrature-phase channel for demodulating a second carrier signal to recover the quadrature-phase data signal and a Hilbert transform of the in-phase data signal, wherein the Hilbert transform of the in-phase data signal is used to improve detection of the in-phase data signal, and the Hilbert transform of the quadrature-phase data signal is used to improve detection of the quadrature-phase data signal.

19. A communication system comprising:

a transmitter for generating a modulated transmission signal, the transmitter including an in-phase channel operative to modulate an in-phase data signal and a Hilbert transform of a quadrature-phase data signal onto a first carrier signal, and a quadrature-phase channel operative to modulate the quadrature-phase data signal and a Hilbert transform of the in-phase data signal onto a second carrier signal, such that the modulated first and second carrier signals when combined provide the modulated transmission signal; and a receiver for receiving the modulated transmission signal, the receiver processing the transmission signal to recover the in-phase and quadrature-phase data signals.

* * * * *